United States Patent
Poce

[19]

[11] Patent Number: 6,125,607
[45] Date of Patent: Oct. 3, 2000

[54] WOOD ARTICLE AND METHOD OF MANUFACTURE

[76] Inventor: John Di Poce, 12 Kleins Ridge, Kleinburg, Ontario, Canada, L0J 1C0

[21] Appl. No.: 08/792,844

[22] Filed: Feb. 3, 1997

[30] Foreign Application Priority Data

Apr. 10, 1996 [CA] Canada .................................. 2187139

[51] Int. Cl.[7] ....................................................... E04C 3/12
[52] U.S. Cl. .................. 52/730.7; 52/586.2; 52/590.2; 52/591.2; 52/591.3; 52/592.2; 52/745.19; 403/381; 144/347
[58] Field of Search ............................. 52/730.7, 731.1, 52/731.3, 731.4, 731.5, 732.1, 732.2, 732.3, 586.2, 590.1, 590.2, 590.3, 591.2, 591.3, 592.2, 592.3, 592.4, 796.1, 746.1, 745.19, 745.21; 144/347, 349, 350, 352, 354, 355, 346; 403/381

[56] References Cited

U.S. PATENT DOCUMENTS

| Re. 8,807 | 7/1879 | Cummings | 52/591.2 |
|---|---|---|---|
| 647,626 | 4/1900 | Gilmour . | |
| 647,627 | 4/1900 | Gilmour . | |
| 1,409,410 | 3/1922 | Rockwell . | |
| 1,444,611 | 2/1923 | Johansson | 52/730.7 X |
| 1,545,173 | 7/1925 | Trost | 52/591.2 |
| 2,382,208 | 8/1945 | Corbin . | |
| 4,394,409 | 7/1983 | Hertel . | |
| 4,624,295 | 11/1986 | Howland . | |
| 5,207,046 | 5/1993 | Vekkeli | 52/730.7 |

FOREIGN PATENT DOCUMENTS

| 1246987 | 8/1967 | Germany | 52/590.2 |
|---|---|---|---|
| 250020 | 6/1948 | Switzerland | 52/590.1 |

*Primary Examiner*—Laura A. Callo
*Attorney, Agent, or Firm*—Philip C. Mendes da Costa; Bereskin & Parr

[57] ABSTRACT

A wood member comprises first and second opposed members made of wood and secured together. Each of the first and second members has spaced sides and a surface extending between the sides. The surfaces include a first portion contoured to define a contact surface which extends in more than one plane, the first portions defining a space therebetween for receiving an adhesive for securing the first and second members together; a second portion contoured to restrict the flow of the adhesive to a position outward from the sides when the first and second members are brought into engagement; and, opposed engagement members configured to lockingly engage without substantial deformation of the engagement members and secure the first and second members together as the adhesive dries.

38 Claims, 2 Drawing Sheets

WOOD ARTICLE AND METHOD OF MANUFACTURE

FIELD OF THE INVENTION

This invention relates generally to an article of wood manufactured from a plurality of individual wood members. In one embodiment, the invention relates in particular to composite structural wood members, such as building studs and the like, and their method of manufacture.

BACKGROUND OF THE PRESENT INVENTION

Dimensional lumber used in construction, such as building studs and other structural building members, are generally prepared by cutting a unitary piece of lumber to the desired size. For example, a typical 2×4 building stud is prepared by cutting a larger piece of lumber to the requisite size.

In operation, logs may be cut at a saw mill to produce lumber of various sizes. The number of pieces of lumber of any particular size which may be produced from a log is limited by the size of the log. For any given size log, a larger number of smaller pieces of lumber may be produced. A log may be cut so as to maximize the number of usable pieces of lumber from a log. Accordingly, for example, the number of pieces of lumber which are suitable for manufacturing 2×4's from any particular log is limited.

In the industry, composite wood members may be made in a variety of different ways. These are typically made by gluing wood pieces of differing sizes of together. For example, plywood, oriented strand board and particle board are prepared by adhering pieces of wood of varying sizes together. See also U.S. Pat. No. 4,624,295 to Howland which discloses a method of producing wood panels by finger joining wood members together.

Methods have also been developed to produce composite wood members from two members, one of which is a high grade wood and the other of which is a low grade wood. See for example U.S. Pat. Nos. 647,626 (Gilmour), 647,627 (Gilmour) and 1,409,410 (Rockwell). These processes are directed at producing a composite wood product which has a good surface appearance by using lesser quality wood.

SUMMARY OF THE PRESENT INVENTION

In accordance with the instant invention there is provided a wood member comprising first and second opposed members made of wood and secured together, each of the first and second members having spaced sides and a surface extending between the sides, the surfaces including a first portion contoured to define a contact surface which extends in more than one plane, the first portions defining a space therebetween for receiving an adhesive for securing the first and second members together; a second portion contoured to restrict the flow of the adhesive to a position outward from the sides when the first and second members are brought into engagement; and, opposed engagement members configured to lockingly engage without substantial deformation of the engagement members and secure the first and second members together as the adhesive dries.

In accordance with a further embodiment of this invention there is provided a wood member adapted to be secured to an opposed second such member, the wood member having spaced sides and a surface extending between the sides, the surface including a first portion contoured to define a contact surface which extends in more than one plane and, when the first member is combined with a second such member, the first portions of the first and second members define a space therebetween for receiving an adhesive for securing the first and second members together; a second portion contoured to restrict the flow of the adhesive to a position outward from the sides when the first member is secured to a second such member; and, engagement means to engage with engagement means of a second such member without substantial deformation of the engagement means and secure the first and second members together as the adhesive dries when the first and second members are brought into engagement.

In accordance with a further embodiment of this invention there is provided a wood member comprising first and second opposed longitudinally extending wood members secured together by securing means, each of the first and second members having spaced longitudinally extending sides and a contact surface extending between the sides, the securing means comprising longitudinally extending complimentary tongues and grooves provided on a portion of the contact surfaces, the tongues and grooves dimension to define a first channel therebetween; locking means comprising opposed engagement members provided on a portion of the contact surfaces adjacent each of the sides wherein, prior to the first and second members being secured together, each of the engagement members has an abutment member and a recess member, the engagement members dimensioned to define a second channel therebetween; and adhesive provided in the first and second channels.

In accordance with a further embodiment of this invention there is provided a method of manufacturing a wood member from a plurality of individual members, each of the individual members having spaced sides, the method comprising the steps of cutting lengthwise in a surface of each of the individual members a complimentary contact surface which extends in more than one plane, the contact surfaces being configured such that, when the individual members are combined together, the contact surfaces define a space therebetween for receiving an adhesive; cutting lengthwise in each of the surfaces engagement means such that, when the individual members are combined together, the engagement means engage without substantial deformation of the engagement means; applying an adhesive to the contact surface and the engagement means of at least one of the individual members; and, aligning the contact surface and the engagement means of one of the individual members with a complementary contact surface and engagement means of a second of the individual members and causing the engagement means to interengage to form the wood member.

One advantage of the instant invention is that the wood member may be used as a structural building member. For example, the wood member may be building studs such as a 2×4 or other structural elements used in construction (e.g. in the framing of the sides or roof of a house or other structure).

In a preferred embodiment of this invention, the contact surface comprises a plurality of fingers and grooves. More preferably, the fingers may be in the shape of truncated triangular members and the grooves are complimentarily shaped to receive the fingers in a non-interference fit. This provides an extended contact surface between the first and second members. When manufactured, the extended contact area between the opposed surfaces assists the wood member to resist warping.

In the further preferred embodiment, the engagement members are positioned adjacent each of the sides of the wood member. The engagement members secure the wood together while the adhesive is drying. The first and second opposed members may be secured together by applying a layer of adhesive between the two layers and then pressing the first and second members together, such as in a press or the like. Once the engagement members having lockingly engaged, the wood member may be removed from the press and moved to a storage area where the adhesive may dry. The engagement members advantageously maintain contact between the interior faces of the opposed members while the adhesive dries thus reducing the required press time.

Further, by positioning the engagement members adjacent each of the sides, the flow of adhesive out of the sides of the wood member during the pressing step is reduced thus preventing the adhesive from adhering to the press or to the sides of the wood.

A further advantage of the instant invention is that the wood member may by manufactured from smaller elements. For example, a 2×4 may be manufactured from two 1×5's. As the cost of two 1×5's is generally less than the cost a 2×4 of similar grade, a 2×4 manufactured by the method of the instant invention may be prepared at a lower cost than a standard 2×4.

DESCRIPTION OF THE DRAWING FIGURES

These and other advantages of the instant invention will be more fully and completely understood in accordance with the following description of a preferred embodiment of the invention in which:

FIG. 1 is a perspective view of a wood member according to the instant invention; and, FIG. 2 is a perspective view of one of the members forming the wood member shown in FIG. 1.

DESCRIPTION OF PREFERRED EMBODIMENT

Figure 1:
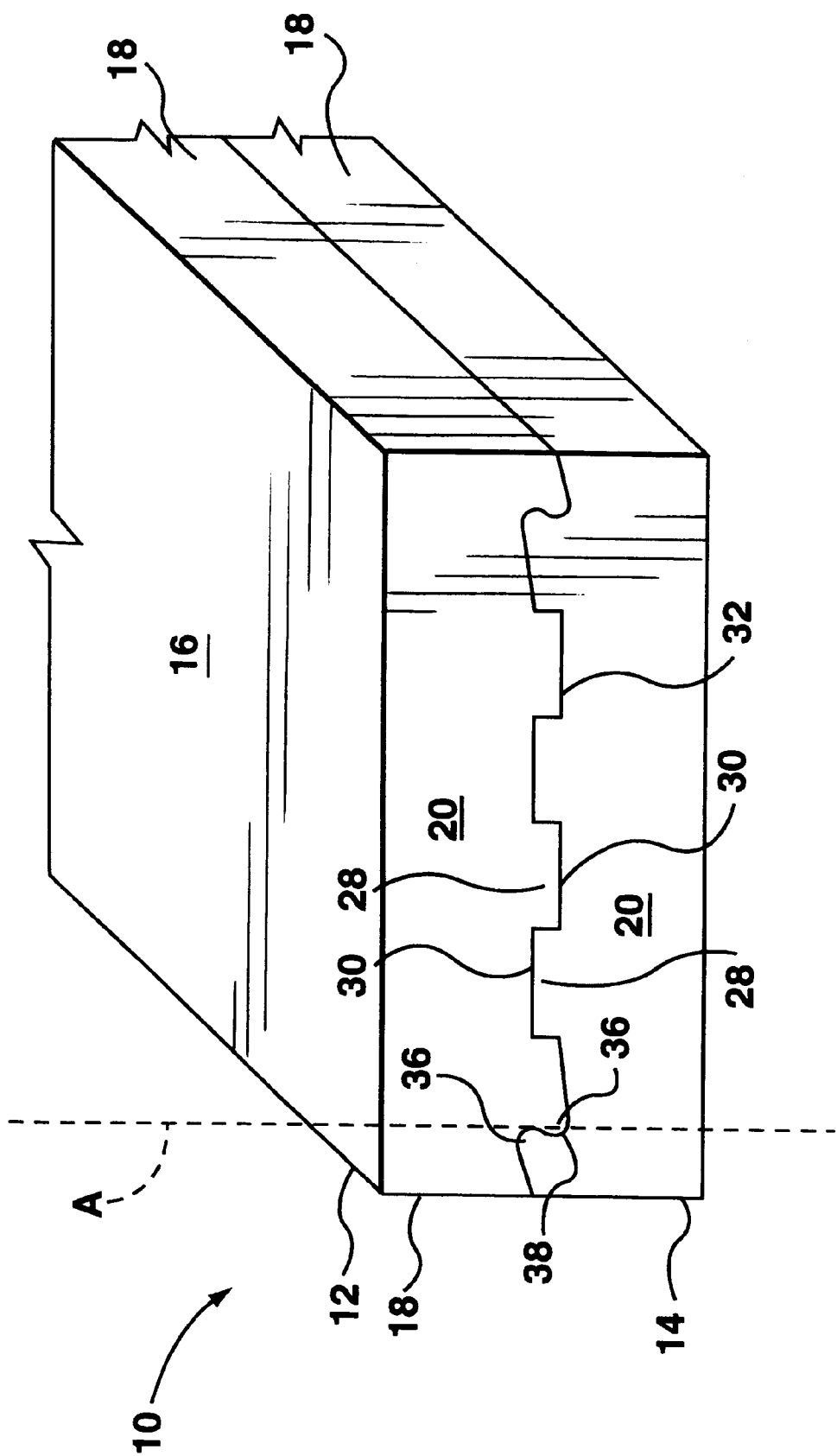
Figure 2:
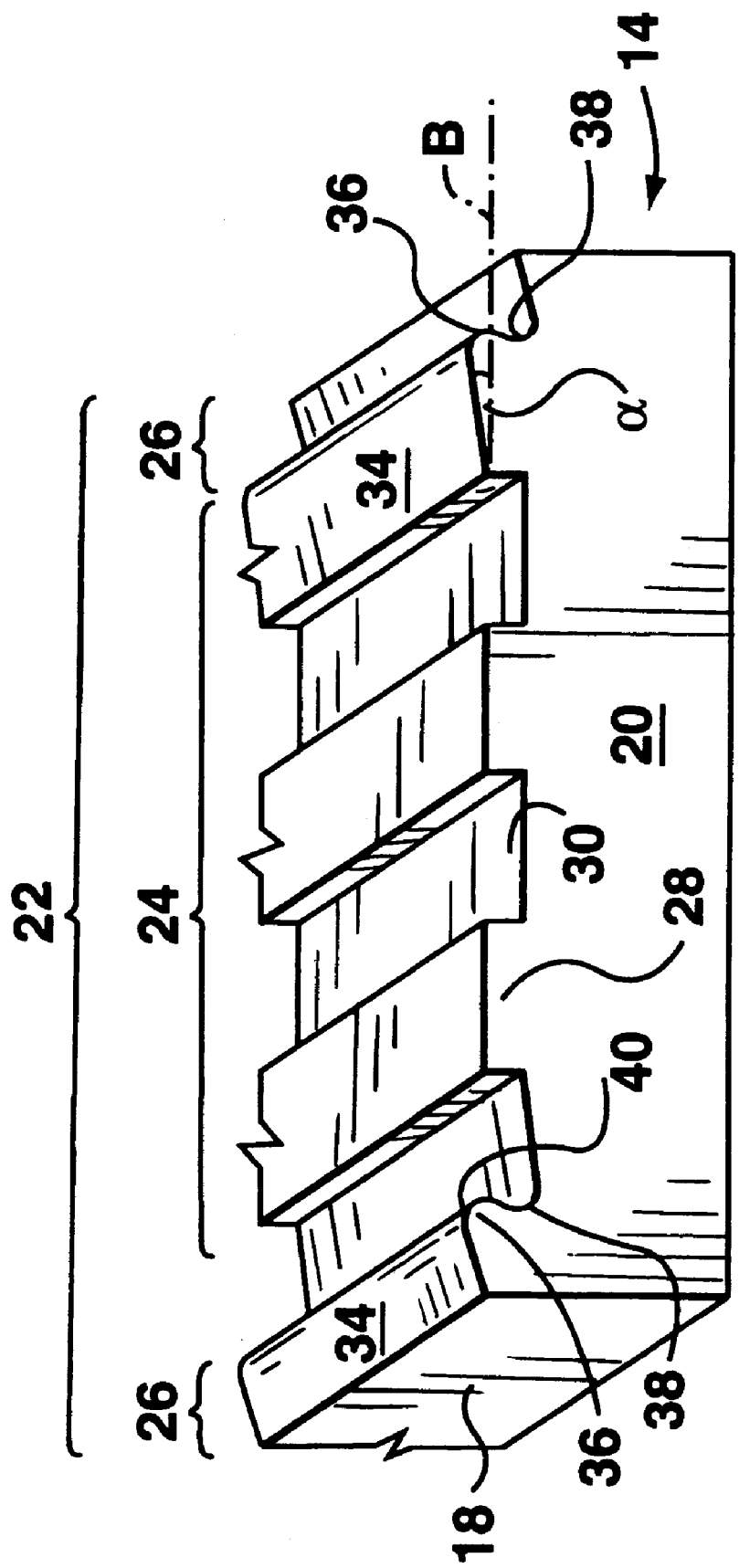

Referring to FIG. 1, wood member 10 may consist of the first member 12 and the second member 14. Wood member 10 has an upper surface 16. Each member 12 and 14 has longitudinally extending sides 18 which extends between end 20 and a distal end (not shown). Referring to FIG. 2, each member 12 and 14 has a surface 22 along which first and second members 12 and 14 matingly engage to form wood member 10.

Wood member 10 may be used for various ways. Preferably, wood member 10 is adapted for use as a structural member and accordingly may comprise a composite piece of dimensional lumber. For example, wood member 10 may used as a structural member during the construction of buildings and may be used in framing the sides and roofs of such buildings. Wood member 10 may accordingly be a 2×3, a 2×4, a 2×6 or other size.

First and second members 12 and 14 may be prepared from wood of any particular size. They may be manufactured from a unitary piece of lumber that is approximately the size of the desired dimensions of member 12 or 14. Preferably, they are manufactured from members which are approximately half the size of the desired dimensions of wood member 10. For example, if wood member 10 is a 2×4 stud, then first and second members 12 and 14 may be prepared from 1×5's. The grade of wood used to produce first and second members 12 and 14 is selected based upon the desired grade of wood member 10. Preferably wood members 12 and 14 are prepared from kiln dried lumber.

The exterior surfaces of wood member 10, such as upper surface 16, may have any desired finish. For example, if wood member 10 is to be used as a building stud, then it may have a standard finish to meet North American tolerance requirements. Alternately, the outer surface of wood member 16 may be dimensioned and finished to meet the tolerances of any particular building code or surface finish which may be required.

Surface 22 has a first portion 24 and engagement members 26. First portion 24 defines an extended contact surface. Surface 24 is configured so as to provided a surface to bond members 12 and 14 together and to resist warping of wood member 10. Accordingly, this surface preferably extends in more than one plane. As shown in FIG. 2, first portion 24 may comprise a plurality of tongues 28 and grooves 30. Preferably, tongues 28 are truncated triangular members. Accordingly, for example, a tongue 28 of second member 14 will be received in a complementary groove 30 of first member 12. These tongues and grooves define an extended contact surface between first and second members 12 and 14. Accordingly, they provide an extended surface along which members 12 and 14 may be glued together. Further, they assist in locking members 12 and 14 together to resist shearing stresses and other forces which may tend to try and separate wood members 12 and 14. Further, they assist wood member 10 to resist warping.

First portion 24 is dimension so that when first and second members 12 and 14 are assembled, first portions 24 define a channel 32. Channel 32 is sized to receive an effective amount of adhesive to bond first and second members 12 and 14 together. Accordingly, for example, tongues 28 may be cut so as to be slightly smaller than grooves 30 so as to produce channel 32. Channel 32 may be dimension to have a thickness in the order of a few thousands of an inch.

A preferred layout of surface 22 is shown in FIG. 2. According to this layout, first portion 24 is centrally located on surface 22 and engagement members 26 are provided adjacent each side 18. If an member 10 having a larger transverse dimension is being produced, additional engagement members may be provided at interior positions with respect to sides 18 and first portions 24 may extend between the engagement members.

During the manufacturing process, adhesive is applied to at least one surface 22. When first and second members 12 and 14 are pressed together some of the adhesive may have a tendency to flow outwards of wood member 10. For example, the adhesive may flow transversely towards sides 18. Preferably, engagement members 26 are provided adjacent sides 18 to restrict the flow of adhesive transversely out of wood member 10. If too much adhesive exits at sides 18, this may damage the machinery used in the manufacturing operation. Further, depending upon the intended use of wood member 10, excessive glue build up on sides 18 may be undesirable. Accordingly, if engagement members 26 are not provided adjacent sides 18, but at an interior position, then surface 22 preferably includes a second portion which is contoured to restrict the flow of adhesive transversely out of wood member 10. It will be appreciated that the engagement members, when positioned adjacent sides 18, define such a second portion.

Engagement members 26 are configured and positioned to lockingly engage first and second members 12 and 14 together and to maintain first and second members 12 and 14 together as the adhesive dries without substantial deformation of engagement members 26. As will be appreciated, engagement members 26 preferably define a channel, which may be smaller than channel 32, for receiving an adhesive. Accordingly, once the adhesive dries, engagement members 26 are bonded together.

In the preferred embodiment shown in FIG. 2, engagement member 26 comprises abutment member 36 and recess member 38.

Referring to FIG. 1, it can be seen that abutment member 36 of first member 12 is received in recess member 38 of second member 14. Similarly, abutment member 36 of second member 14 is received in recess member 38 of first member 12. Referring to FIG. 1, line A is a line extending parallel to side 18 positioned at the distal edge of abutment member 36 of second member 14. As shown in FIG. 1, recess member 38 of second member 14 defines a cavity transverse of line A and beneath abutment member 36 of second member 14. This cavity is adapted to receive an abutment member. Abutment member 36 of first member 12 extends transversely past line A towards side 18 so as to received beneath abutment member 36 in recess member 38. Similarly, abutment member 36 of second member 14 is received in recess member 38 of first member 12 above abutment 36 of first member 12. A similar configuration is shown on the other side of wood member 10. Accordingly, engagement members 26 create an interference fit which lockingly engages first and second members 12 and 14.

As discussed below, a preferred method of manufacturing wood member 10 is by positioning members 12 and 14 in an overlying relationship and then compressing the members thereby forcing engagement members 26 to interengage. In order to assist this operation, engagement members 26 preferably includes cam means to assist engagement members 26 to interengage. Accordingly, as shown in FIG. 2, abutment member 36 of second member 14 may have a curved upper surface 40 which defines a cam surface along which abutment member 36 of first member 12 may travel as first and second members 12 and 14 are pressed together. Similarly, abutment member 36 of first member 12 may also have a cam means. Preferably, abutment member 36 and recessed member 38 define an S shaped profile as may best be seen in FIG. 1.

As will appreciated, abutment members 36 do not significantly deform during this operation. If abutment member 36 were to significantly deform, then abutment members 36 would not interact with recess members 38 to lockingly engage first and second members 12 and 14.

Referring to FIG. 2 line B, is a line extending across the upper surfaces of tongues 28 parallel to the bottom surface of second member 14. Preferably, surface 34 is inclined at an angle with respect to line B. Preferably, angle varies from about 5 to about 10° and, more preferably, angle is about 7°.

The following is a description of a preferred method of manufacturing wood member 10.

In order to prepare wood member 10, first and second members 12 and 14 must first be prepared. First and second members 12 and 14 may be prepared by cutting the appropriately dimension blocks from larger pieces of lumber. The dimensions of first and second members 12 and 14, and accordingly the dimension of the lumber from which they are cut, are based upon the preselected dimensions of wood member 10. Once the dimensions of wood member 10 are determined, lumber is selected for preparing first and second members 12 and 14. Preferably, first and second members 12 and 14 are sized so that they have approximately the same thickness. Accordingly, the interface of first and second members 12 and 14 is positioned adjacent the centre of the thickness of wood member 10.

Preferably, the surfaces of members 12 and 14 which will define the outer surfaces of wood member 10 (e.g. sides 18 and surface 16) are planed to within the desired tolerances which wood member 10 must meet.

Subsequently, the desired profile of surface 22 is cut into a surface of wood members 12 and 14. This profile may be cut by any means known in the art. Once cut, members 12 and 14 may then be stored for later use or may proceed immediately to manufacture wood member 10.

When it is desired to manufacture wood member 10, second member 14 may be provided. A layer of adhesive may then be applied to surface 22 thereof. If desired, a layer of adhesive may also be applied to surface 22 of first member 12. A sufficient amount of adhesive to bond members 12 and 14 together is applied. The layer of adhesive is preferably applied at least substantially across surface 22 and, more preferably, continuously across surface 22. The adhesive may be any wood glue.

First member 12 is then positioned so that surface 22 of first member 12 is opposed to surface 22 of second member 14 and aligned so that first portions 24 are complimentary to each other and engagement means 26 are aligned to interlock when first and second members 12 and 14 are brought together. Once first and second members 12 and 14 are aligned, they are pressed together, such as by passing them through a press with sufficient force such that engagement members 26 interengage.

Once engagement members 26 interengage, wood member 10 may be removed from the press and taken to an area where the adhesive may cure. Accordingly, one advantage of the instant invention is that the required press time for manufacturing wood member 10 may be minimized. Due to the provision of engagement members 26, first and second members 12 and 14 do not need to remain in the press until the adhesive dries.

As will be observed from FIG. 1, first and second members 12 and 14 may be cut with the same profile. Accordingly, in the manufacturing operation, member 12 and 14 may be selected from any of those members which are cut in the preliminary stage. Accordingly, a further advantage of the instant invention is that only a single cutting line need to be set up and only a single series of members needs to be stored. When it desired to manufacture wood member 10, two pre-cut members are taken. Once the adhesive is applied to surface 22 of one of the members, the other member may be inverted (creating a mirror profile) so as to form wood member 10.

It will be appreciated by those skilled in the art that other modification may be made to the wood member and the method disclosed herein and all are considered within the scope of this invention. For example, by modifying the method of the instant invention, a wood member comprising a plurality of members 12 and 14 may be prepared. For example, surface 22 may be cut in surface 16 of first member 12. A complimentary shaped second member 14 may then be secured to upper surface 16 of first member 12.

What is claimed is:

1. A wood member comprising first and second longitudinally eatending opposed members made of wood and secured together and defining a longitudinal direction, each of said first and second members having spaced sides and a surface extending between said sides, each of said surfaces of said opposed members including:

(a) a first portion contoured to define a contract surface which extents in more than one plane, said first portions defining a space therebetween for receiving an adhesive for securing said first and second members together; and (b) opposed engagement members configured to lockingly engage when said opposed members are brought into engagement directly from a position in which said surfaces are at least partially facing one another without substantial deformation of said engagement members and to secure said first and second members together in all directions transverse to the longitudinal direction as said adhesive dries.

2. The wood member as claimed in claim 1 wherein said engagement members are positioned adjacent each of said sides.

3. The wood member as claimed in claim 2 wherein said engagement members comprise a second portion contoured to restrict the flow of the adhesive.

4. The wood member as claimed in claim 1 wherein, prior to said first and second members being secured together, each of said engagement members has an abutment member and a recess member, each of said recess members receiving the abutment member of the opposed engagement member.

5. The wood member as claimed in claim 4 wherein each of said abutment members extends transversely away from its associated recess member and each of said abutment members is recessed transversely in the respective opposed recess member.

6. The wood member as claimed in claim 5 wherein each abutment member includes a cam portion to assist said abutment members to deflect around each other as said opposed engagement members are brought into engagement.

7. The wood member as claimed in claim 5 wherein each recess member and its associated abutment member define an S shaped profile having a upper portion which extends furthest into said respective opposed member.

8. The wood member as claimed in claim 7 wherein said abutment member has a planar surface which extends from the upper portion of said S shaped profile downwardly at a shallow angle to a plane extending through said wood member transversely of said sides.

9. The wood member as claimed in claim 1 wherein the contact surfaces of said first portions comprise tongue and groove members.

10. The wood member as claimed in claim 1 wherein said first and second members are the same.

11. A longitudinally extending wood member defining a longitudinal direction adapted to be secured to an opposed second such member, said member having spaced sides and a surface extending between said sides, said surface including:
   (a) a first portion contoured to define a contact surface which extends in more than one plane and, when said first member is combined with a second such member, said first portions of said first and second members define a space therebetween for receiving an adhesive for securing said first and second members together; and,
   (b) an engagement member to lockingly engage with an engagement member of a second such wood member without substantial deformation of said engagement members and to secure said first and second members together in all direction transverse to said longitudinal direction as said adhesive dries when said first and second wood members are brought into engagement directly from a position in which said first and second members are at least partially facing one another.

12. The wood member as claimed in claim 11 wherein said engagement members comprise a plurality of engagement portions and one of said engagement portions is positioned adjacent each of said sides.

13. The wood member as claimed in claim 12 wherein said engagement member comprises a second portion contoured to restrict the flow of the adhesive.

14. The wood member as claimed in claim 13 wherein each of said engagement portions has an abutment member and a recess member with each of said recess members sized to receive the abutment member of an engagement portion of a second wood member.

15. The wood member as claimed in claim 14 wherein each of said abutment members extends transversely from its associated recess member and each of said abutment members is sized to extend transversely of the abutment member of a second opposed wood member.

16. The wood member as claimed in claim 15 wherein each abutment member includes a cam portion to assist said abutment members to deflect around each other as opposed engagement members are brought into engagement.

17. The wood member as claimed in claim 15 wherein each recess member and its associated abutment member define an S shaped profile having a upper portion which is sized to extend furthest into a second opposed wood member.

18. The wood member as claimed in claim 17 wherein said abutment member has a planar surface which extends from the upper portion of said S shaped profile downwardly at a shallow angle to a plane extending through said wood member transversely of said sides.

19. The wood member as claimed in claim 11 wherein the contact surfaces of said first portions comprise tongue and groove members.

20. The wood member as claimed in claim 11 wherein said first and second members are the same.

21. A wood member comprising first and second opposed longitudinally extending wood members secured together and defining a longitudinal direction, each of said first and second members having spaced longitudinally extending sides and a contact surface extending between said sides, said contact surface having:
   (a) longitudinally extending complimentary tongues and grooves provided on a portion of said contact surfaces, said tongues and grooves dimensioned to define a first channel therebetween;
   (b) locking means comprising opposed engagement members provided on a portion of said contact surfaces adjacent each of said sides wherein, prior to said first and second members being secured together, each of said engagement members has an abutment member and a recess member and each of said abutment member includes a cam portion to assist said abutment members to deflect around each other as said opposed engagement members are brought into engagement when pressed together from a position in which said contact surfaces are at least partially facing one another, said engagement members dimensioned to define a second channel therebetween; and
   (c) adhesive provided in said first and second channels.

22. The wood member as claimed in claim 21 wherein said each of said abutment members extends transversely from its associated recess member and each of said abutment members is recessed transversely in the respective recess member.

23. The wood member as claimed in claim 22 wherein each of said recess members and its associated abutment member define an S shaped profile having an upper portion which extends furthest into said respective opposed member.

24. The wood member as claimed in claim 23 wherein said abutment member has a planar surface which extends from the upper portion of said S shaped profile downwardly at a shallow angle to a plane extending through said wood member transversely of said sides.

25. The wood member as claimed in claim 24 wherein said angle is about 10°.

26. The wood member as claimed in claim 21 wherein each of said tongues comprises a truncated triangular member and each of said grooves is sized to receive a tongue.

27. The wood member as claimed in claim 21 wherein said first and second members are the same.

28. A method of manufacturing a wood member from a plurality of individual members, each of said individual members having spaced sides, said method comprising the steps of:
   (a) cutting, in a longitudinal direction, in a surface of each of said individual members a complimentary contact surface which extends in more than one plane, said contact surfaces being configured such that, when said individual members are combined together, said contact surfaces define a space therebetween for receiving an adhesive;
   (b) cutting, in said longitudinal direction, in each of said surfaces engagement members such that, when said individual members are combined together, said engagement members lockingly engage said wood individual members in all directions transverse to said longitudinal direction, without substantial deformation of said engagement members;
   (c) applying an adhesive to said contact surface and said engagement means of at least one of said individual members; and,
   (d) positioning said contact surface and said engagement means of one of said individual members with a complementary contact surface and engagement means of a second of said individual members such that the contact surfaces at least partially face one another; and
   (e) causing said engagement means to lockingly engage by pressing said individual members together from the position of step (d).

29. The method as claimed in claim 28 wherein said engagement means are positioned adjacent each of said sides.

30. The method as claimed in claim 28 wherein, prior to said individual members being lockingly engaged, each of said engagement members has an abutment member and a recess member with each of said recess members sized to receive the abutment member of an opposed engagement means.

31. The method as claimed in claim 30 wherein said each of said abutment members extends transversely from its associated recess member and each of said abutment members is recessed transversely in the respective recess member as said individual members are lockingly engaged.

32. The method as claimed in claim 28 wherein said engagement members includes a cam portion to assist said engagement means to lockingly engage without substantial deformation of said engagement members.

33. The method as claimed in claim 28 wherein each engagement members has an S shaped profile with an upper portion which, when said wood member is formed, extends furthest into said the respective opposed individual member.

34. The method as claimed in claim 33 wherein said engagement members has a planar surface which extends from the upper portion of said S shaped profile downwardly at a shallow angle to a plane extending through said wood member transversely of said sides.

35. The method as claimed in claim 34 wherein said angle is about 10°.

36. The method as claimed in claim 34 wherein the contact surfaces comprise complimentary tongue and groove members.

37. The method as claimed in claim 28 wherein said first and second members are the same.

38. The method as claimed in claim 28 wherein said wood member comprises dimensional lumber having a preselected size, said method further comprises the step of cutting said individual members from larger pieces of wood, said individual members sized to form said dimensional lumber having said preselected size.

* * * * *

UNITED STATES PATENT AND TRADEMARK OFFICE
CERTIFICATE OF CORRECTION

PATENT NO.  : 6,125,607
DATED       : October 3, 2000
INVENTOR(S) : John Di Poce It is certified that error appears in the above-identified patent and that said Letters Patent is hereby corrected as shown below:

Corrections to be made are <u>underlined</u>.

Column 5, lines 46 - 48 should read:
Preferably, surface 34 is inclined at an angle $\underline{\propto}$ with respect to line B. Preferable, angle $\underline{\propto}$ varies from about 5 to 10° and, more preferably, angle $\underline{\propto}$ is about 7°.

Column 6, line 58 should read:
  longitudinally e$\underline{x}$tending opposed members . . .

Column 7, line 59 should read:
  together in all direction$\underline{s}$ transverse to said . . .

Signed and Sealed this

First Day of May, 2001

*Attest:*

NICHOLAS P. GODICI

*Attesting Officer*    *Acting Director of the United States Patent and Trademark Office*